(12) United States Patent
Benkreira et al.

(10) Patent No.: US 11,741,520 B2
(45) Date of Patent: Aug. 29, 2023

(54) METHODS AND SYSTEMS FOR PROVIDING CROWD INFORMATION AND REPEAT INFORMATION RELATED TO AN ESTABLISHMENT USING DIGITAL IMAGE INFORMATION

(71) Applicant: Capital One Services, LLC, McLean, VA (US)

(72) Inventors: Abdelkader M'Hamed Benkreira, New York, NY (US); Salik Shah, Washington, DC (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 23 days.

(21) Appl. No.: 16/554,921

(22) Filed: Aug. 29, 2019

(65) Prior Publication Data
US 2021/0065271 A1    Mar. 4, 2021

(51) Int. Cl.
| | |
|---|---|
| *G06Q 30/06* | (2023.01) |
| *G06Q 30/0601* | (2023.01) |
| *G06F 16/535* | (2019.01) |
| *G06F 16/587* | (2019.01) |
| *G06V 20/20* | (2022.01) |
| *G06V 20/30* | (2022.01) |

(52) U.S. Cl.
CPC ....... *G06Q 30/0623* (2013.01); *G06F 16/535* (2019.01); *G06F 16/587* (2019.01); *G06V 20/20* (2022.01); *G06V 20/30* (2022.01)

(58) Field of Classification Search
CPC .......................... G06Q 30/06; G06Q 30/0623
USPC ................................................ 705/26.1–27.2
See application file for complete search history.

(56) References Cited

U.S. PATENT DOCUMENTS

| | | | | |
|---|---|---|---|---|
| 2012/0116920 | A1* | 5/2012 | Adhikari | G09G 5/00 |
| | | | | 705/26.61 |
| 2014/0279185 | A1 | 9/2014 | Merz et al. | |
| 2014/0287779 | A1* | 9/2014 | O'Keefe | H04W 4/024 |
| | | | | 455/456.3 |
| 2015/0073907 | A1* | 3/2015 | Purves | G06Q 20/32 |
| | | | | 705/14.58 |
| 2015/0116356 | A1* | 4/2015 | Alon | G06T 19/006 |
| | | | | 345/633 |
| 2016/0148218 | A1* | 5/2016 | Koch | G06Q 30/0201 |
| | | | | 705/7.29 |

(Continued)

OTHER PUBLICATIONS

Ozaita, Alejandro. University of Twente student theses. (n.d.). "Detection of the crowdedness of a place sensing the devices in the area" Retrieved Feb. 2017, from https://essay.utwente.nl/72436/1/thesis_Alejandro_Ozaita.pdf.*

*Primary Examiner* — Jeffrey A. Smith
*Assistant Examiner* — Jennifer V Lee
(74) *Attorney, Agent, or Firm* — DLA Piper LLP US (57) ABSTRACT

Systems and methods to provide transaction-related insight information for an establishment. In some aspects of the present disclosure, a digital image captured at a location of a user can be received. The digital image can be analyzed to identify an establishment. Transaction data between customers and the establishment can be retrieved. Transaction-related insight information about the establishment can be generated based on the data. The transaction-related insight information can be provided to the user.

20 Claims, 7 Drawing Sheets

(56) References Cited

U.S. PATENT DOCUMENTS

2017/0032385 A1* 2/2017 Thomas ................ G06Q 50/12
2020/0104757 A1* 4/2020 Molinari ................ H04L 51/02

* cited by examiner

| Transaction | |
|---|---|
| Customer Name | John Smith |
| Customer ID | 12345 |
| Merchant Name | Green Pub |
| Merchant ID | 98765 |
| Amount | $32.57 |
| Date | 01/13/2019 |
| Time | 7:41 pm |
| Location | 38.905984, -77.065206 |
| Payment Method | Credit card (Visa) |

METHODS AND SYSTEMS FOR PROVIDING CROWD INFORMATION AND REPEAT INFORMATION RELATED TO AN ESTABLISHMENT USING DIGITAL IMAGE INFORMATION

FIELD

The present disclosure relates generally to providing insights about establishments.

BACKGROUND

When people are visiting an establishment, e.g., a store or restaurant, they often wish to know more about the establishment before they go, e.g., how busy it is, how long the wait times are, how big the crowds are, whether it is easy to get a seat, customer satisfaction ratings etc. Current insight information for establishments is limited. Thus, there is a need to provide real-time and comprehensive insight information.

SUMMARY

According to one aspect, the present disclosure relates to a computer-implemented method for providing transaction-related insight information about an establishment. A digital image captured at a location of a user can be received, the digital image captured by a digital camera connected to a device or received through a computer via a network connection. The digital image can be searched for identification features to identify an establishment. Transaction data between customers and the establishment can be retrieved. Insight about the establishment can be generated based on the retrieved data. The transaction-related insight information can be provided to the user on the user's device.

According to another aspect, the identification features can include at least one of a sign, words on a sign, logo, trademark, door, window, façade, or window display to identify the establishment, or any combination thereof.

According to another aspect, the transaction-related insight information can be provided for display as a pop-up notification in an augmented reality overlay of the digital image of the establishment on a device. The pop-up notification can include a name of the establishment and an indicator of a type of products or services offered by the establishment.

According to an additional aspect, a characteristic of the user can be identified. First transaction data including a transaction between the user and a first establishment can be retrieved. Additional customers having the characteristic can be retrieved. Additional customer transactions between additional customers and a second establishment having a same merchant type as the first establishment can be identified. A transaction-related insight information about the second establishment based on the second establishment transactions can be generated. The transaction-related insight information about the second establishment can be provided for display to the user.

According to another aspect, based on the retrieved data, additional customers that have conducted multiple transactions with the establishment can be identified. A score can be generated representing the additional customers that have conducted multiple transactions with the establishment based. The score can be provided as the transaction-related insight information for display to the user.

According to another aspect, based on the retrieved data, return transactions that involve returning a product to the establishment can be identified. A score representing the return transactions can be generated. The score can be provided as the transaction-related insight information for display to the user.

According to another aspect, based on the retrieved data, an average transaction amount or a range of transaction amounts within which a certain percentage of the transactions fall can be calculated. The average transaction amount or range of transaction amounts can be provided as the transaction-related insight information for display to the user.

According to another aspect, the retrieved data can retrieved at a time of day during which the establishment is busiest. The determined time of day can be provided as the transaction-related insight information for display to the user.

According to another aspect, a time of day at which the digital image was captured can be identified. A number of transactions that occurred at the time of day can be identified from the retrieved data. Based on the number of transactions that occurred at the time of day, a score representing how busy the establishment is at the time of day can be calculated. The score can be provided as the transaction-related insight information to the user.

According to another aspect, based on the retrieved data, an average tip amount or a range of tip amounts can be calculated. The average tip amount or range of tip amounts can be provided as the transaction-related insight information for display to the user.

According to another aspect, based on the retrieved data, a percentage of the transactions where the home address of the customer conducting the transaction is within a predetermined distance of the establishment can be determined. A score can be calculated based on the determined percentage. The score can be provided as the transaction-related insight information to the user.

According to another aspect, data can be retrieved representing transactions between customers and establishments in a geographical region. Transaction-related insight information for the establishments can be generated based on common features and/or time-related information in the data. A data model identifying the establishments and the transaction-related insight information for the geographical region can be generated. An indication of a location of a device can be retrieved. A location of the device can be determined to be within the geographical region, and the data model can be provided over a network to the device in response to determining that the device is within the geographical region.

According to another aspect, a request for additional transaction-related insight information that was not included in the data model for one of the establishments can be received. Data representing transactions between customers and the establishment can be retrieved. Additional transaction-related insight information for the establishment based on the data can be retrieved, and the transaction-related insight information can be provided for display to the user.

According to another aspect, a device can be used for providing a transaction-related insight information about an establishment. Digital images from a camera can be received, the digital image captured by a digital camera connected to a device or received through a computer via a network connection. Identification features for an object in one of the digital images can be extracted. The identification features can be compared to a data model to identify an establishment pictured in the digital image. Transaction-related insight information about the establishment can be retrieved to display to a user. The transaction-related insight information about the establishment can be provided for display to the user on the user's device as an augmented reality overlay of a digital image of the establishment.

According to another aspect, the device can be a mobile phone or a wearable computer.

According to another aspect, the establishment can be a first establishment, and information about the object in the digital image can be received after making a determination that the object in the digital image was within a predetermined distance of the camera when the digital image was captured. A second digital image can be discarded after determining that an object in the second digital image was greater than the predetermined distance from the camera when the second digital image was captured.

According to another aspect, each of the digital images can be received (e.g., over a network from a remote device) in response to a determination that the camera had been focused on a particular object for at least a predetermined period of time.

According to another aspect, a location of the device can be determined. The data model can be downloaded, based on the location of the device. The location of the device can be determined with a global positioning system (GPS) receiver. Based on the data model, a number of establishments within a predetermined distance of the device can be identified based on the determined location. The information about the object to information stored in association with the number of establishments in the data model can be captured to identify the establishment pictured in the digital image.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure may help people understand more about an establishment before they go to the establishment. For example, when people are going out shopping, or to a restaurant/bar, movie theater, theme park, sports venue, music venue, etc., they often wish to know more about the establishment before they go, e.g., how busy it is, how long the wait times are, how big the crowds are, whether it is easy to get a seat, customer satisfaction ratings etc. In some embodiments of the present disclosure, multiple types of transaction-related insight information about an establishment can be provided in a single location, such as on a single computer application, web page, document, etc. In some embodiments, systems and methods can also be provided that are harder for persons to exploit or game (e.g., by leaving multiple false reviews in order to skew the ratings up).

Figure 1:
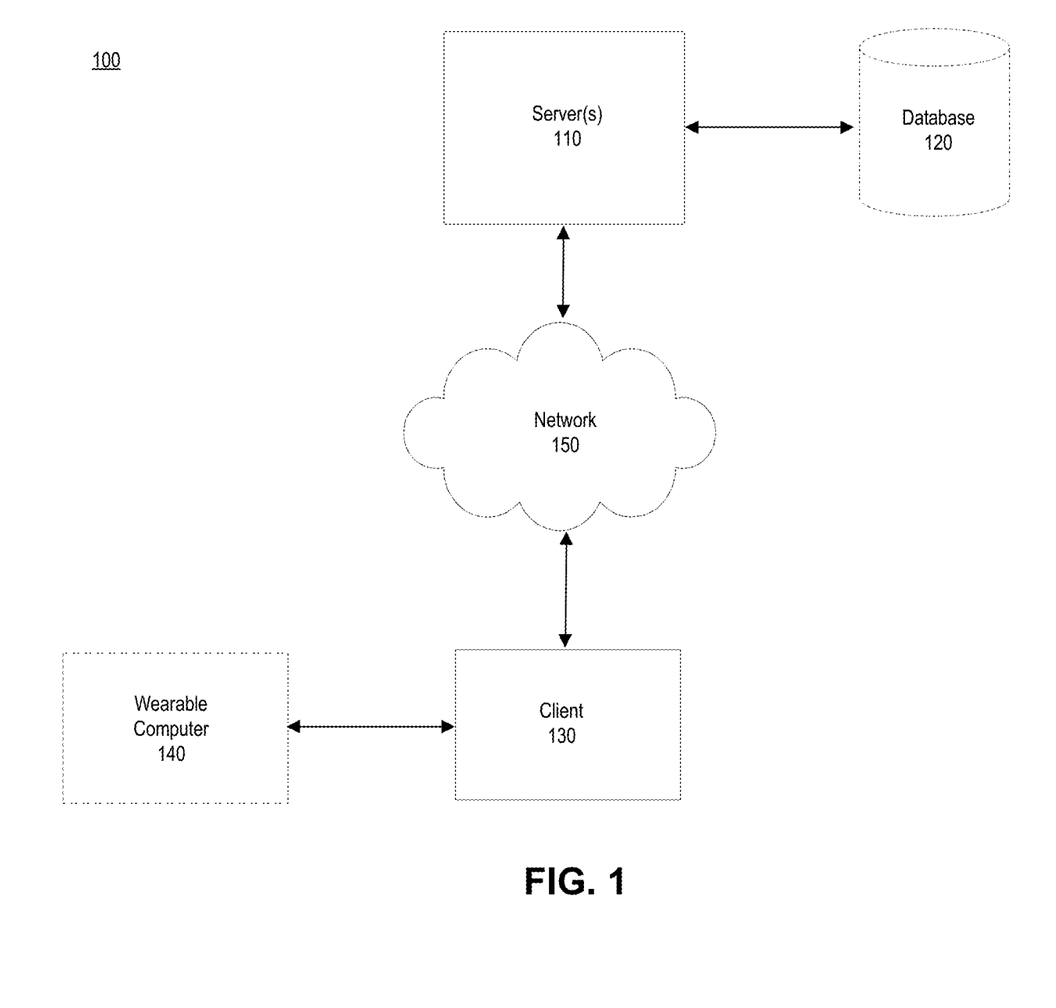
FIG. 1 is a diagram of an illustrative system 100 for providing a transaction-related insight information about an establishment, according to some embodiments of the present disclosure.

FIG. 1 is a diagram of an illustrative system 100 for providing transaction-related insight information about an establishment, according to some embodiments of the present disclosure. As shown in FIG. 1, a client 130 can access (e.g., over a network 150 using server(s) 110) data representing transactions between customers and establishment stored in a database 120. The database 120 can store instructions in one or more memories. The client can also access digital images taken using a camera (e.g., a digital camera, a device incorporating a digital camera, a wearable computer 140, etc.).

A digital image may be any form of data that represents a physical object. In some embodiments, the digital image may be a file (compressed or uncompressed) that represents a physical object. The file may have a known image file format, such as Joint Photographic Experts Group (JPEG), JPEG 2000, Exchangeable image file format (Exif), Tagged Image File Format (TIFF), Graphics Interchange Format (GIF), Windows bitmap (BMP), Portable Network Graphics (PNG), portable pixmap (PPM), portable graymap (PGM), portable bitmap (PBM), portable aNy map (PNM), WebP, high-dynamic-range (HDR), High Efficiency File Format (HEIF), BAT, Better Portable Graphics (BPG), or any other known image file format. In some embodiments, a digital image may be an identifier that identifies a physical object, such as a textual or alphanumeric identifier (e.g., STARBUCKS™ or the mermaid trademark of STARBUCKS™). In some embodiments, a digital image may represent one or more physical objects in an environment surrounding a location of a person, such as a sign, words on a sign, logo, trademark, door, window, façade, window display, building, street, street sign, landmark, hallway, atrium, or any other physical object that may surround a person at a given location. According to some aspects of the disclosure, the physical objects (e.g., signs, words, logos, trademarks, etc.) may uniquely identify an establishment.

According to aspects of the disclosure, a device can be used for providing transaction-related insight information about an establishment. Digital images from a camera can be received. Information about an object in one of the digital images can be extracted. For example, the digital image can be a store front of STARBUCKS™, and the mermaid symbol can be extracted. The information about the object can be run through a data model to compare the digital image to other digital images in order to identify an establishment pictured in the digital image. For example, the STARBUCKS™ mermaid can be compared to other digital images to find a match. Transaction-related insight information about the establishment can be retrieved to display to a user. The transaction-related insight information about the establishment can be provided for display to the user as an augmented reality overlay of an image of the establishment. The augmented reality overlay can be displayed on a phone, a laptop, a pair of glasses, etc.

According to aspects of the disclosure, the device can be a mobile phone or a wearable computer. The establishment can be a first establishment, and information about the object in the digital image can be received after making a determination that the object in the digital image was within a preset distance of the camera when the digital image was captured. A second digital image can be discarded after determining that an object in the second digital image was greater than the predetermined distance from the camera when the second digital image was captured. For example, the first establishment can be identified to be STARBUCKS™ and the second establishment can be identified to be MCDONALDS™. The system can determine that the STARBUCKS™ is 10 yards away by using the global positioning system (GPS) coordinates of the STARBUCKS™ and the GPS location of the device. Similarly, the system can determine that the MCDONALDS™ is 20 yards away. If the preset distance was 15 yards from the device, the MDCONALDS™ digital image can be discarded.

According to aspects of the disclosure, each of the digital images can be received (e.g., over a network from a remote device) in response to a determination that the camera had been focused on a particular object for at least a predetermined period of time.

A location of the device can be determined. The data model can be downloaded. based on the location of the device. The location of the device can be determined with a GPS receiver. The system can perform a lookup for the data model in a database using GPS location information. Based on the data model, a number of establishments within a predetermined distance of the device can be identified based on the determined location. The information about the object to information stored in association with the number of establishments in the data model can be captured to identify the establishment pictured in the digital image.

Figure 2:
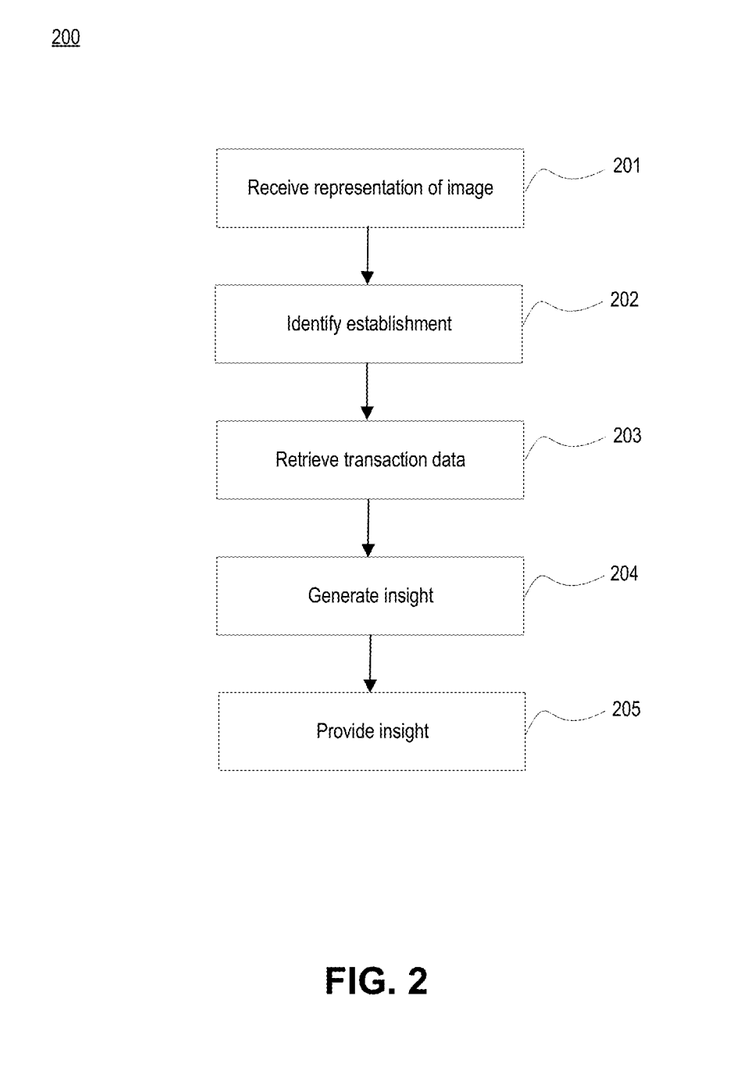
FIG. 2 is a flow diagram 200 showing processing that may occur when providing a transaction-related insight information within the system of FIG. 1, according to some embodiments of the present disclosure.

FIG. 2 is a flow diagram 200 showing processing that may occur within the system of FIG. 1, according to some embodiments of the present disclosure. In step 201, a representation of a digital image captured at a location of a user can be received. In step 202, the representation of the captured digital image can be analyzed to identify an establishment. For example, the representation of the captured digital image can be analyzed (e.g., using Optical Character Recognition (OCR)) for at least one of a sign, words on a sign, logo, trademark, door, window, façade, or window display to identify the establishment, or any combination thereof.

In step 204, the transaction-related insight information about the identified establishment can be generated based on the retrieved data. For example, based on the retrieved data, a number of customers that have conducted multiple transactions with the establishment can be identified. A score or value (e.g., indicating the number of customers, indicating a star rating based on the number of customers) can be generated representing the number of customers that have conducted multiple transactions with the establishment based on the identified number. The score can be provided as the transaction-related insight information for display to the user.

As another example, based on the retrieved data, a number of transactions that involve returning a product to the establishment can be identified. A score or value (e.g., indicating the number of transactions, indicating a star rating based on the number of transactions) representing the number of transactions that involve returning a product to the establishment based on the identified number can be generated. The score can be provided as the transaction-related insight information for display to the user.

As an additional example, based on the retrieved data, an average transaction amount or a range of transaction amounts within which a certain percentage of the transactions fall can be calculated. The average transaction amount or range of transaction amounts can be provided as the transaction-related insight information for display to the user.

As a further example, the retrieved data can be retrieved at a time of day during which the establishment is busiest. The determined time of day can be provided as the transaction-related insight information for display to the user. For example, if it is determined that 11:30-2:30 PM is the busiest time of day for an establishment, transaction-related insight information can indicate that "11:30-2:30 PM is the busiest time of day."

As an additional example, a time of day at which the digital image was captured can be identified. A number of transactions that occurred at the time of day can be identified from the retrieved data. Based on the number of transactions that occurred at the time of day, a score or rating (e.g., indicating the number of transactions, indicating a star rating based on the number of transactions) representing how busy the establishment is at the time of day can be calculated. The score can be provided as the transaction-related insight information to the user.

As a further example, based on the retrieved data, an average tip amount or a range of tip amounts for a certain time period on a certain day can be calculated. The average tip amount or range of tip amounts can be provided as the transaction-related insight information for display to the user. For example, if the average tip amount for a Friday night from 6-10 PM is $21 or 18%, or if 80% of the tips were between 18% and 20%, this information could be provided as transaction-related insight information displayed to the user.

As another example, based on the retrieved data, a percentage of the transactions made during a designated day and time, where the home address of the customer conducting the transaction is within a predetermined distance of the establishment, can be determined. A score or rating can be calculated based on the determined percentage. The score or rating can be provided as the transaction-related insight information to the user. For example, if 80% of transactions made at the establishment on Friday from 6-11 PM were done with people who lived within 1 mile of the establishment, this information could be provided as transaction-related insight information indicating that it had a score of 8 for "popular with locals".

As another example, a characteristic of the user can be identified. Data representing a transaction between the user and a first establishment can be retrieved. Customers having the characteristic can be retrieved. Transactions between the customers having the characteristic and a second establishment having a same merchant type as the first establishment can be identified. An transaction-related insight information about the second establishment based on the identified transactions can be generated. The transaction-related insight information about the second establishment can be provided for display to the user. In step 205, the transaction-related insight information is provided to the user. For example, the transaction-related insight information can be provided for display as a pop-up notification in an augmented reality overlay of a digital image of the establishment on a device. The pop-up notification can further include a name of the establishment and an indicator of the type of products or services offered by the establishment.

Figure 3:
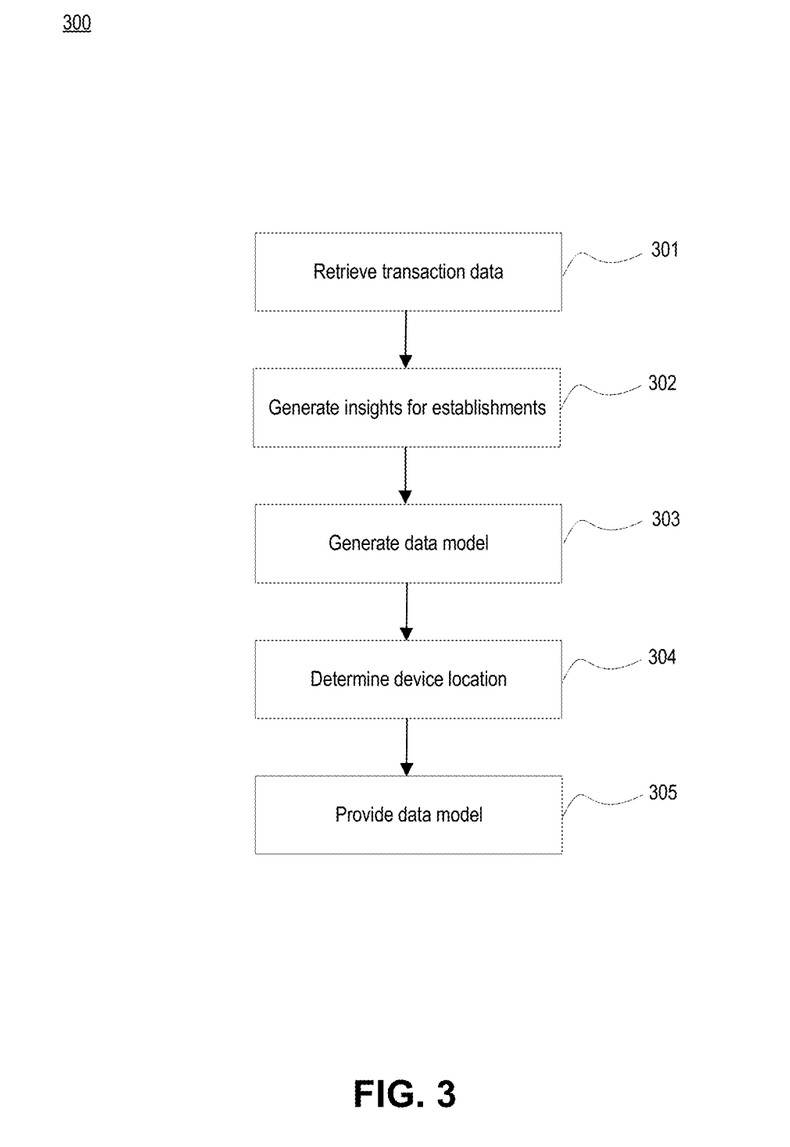
FIG. 3 is a flow diagram 300 showing processing that may occur when providing a data model within the system of FIG. 1, according to some embodiments of the present disclosure.

FIG. 3 is a flow diagram 300 showing additional processing that may occur within the system of FIG. 1, according to some embodiments of the present disclosure. In 301, transaction data representing transactions between customers and establishments in a geographical region can be retrieved. For example, transaction data for establishments in various malls around the United States can be retrieved. In step 302, transaction-related insight information for the establishments can be retrieved based on the retrieved data. For example, transaction-related insight information for establishments in the various malls in various regions can be retrieved. In step 303, a data model can be used for identifying establishments and transaction-related insight information for predetermined geographical regions. For example, a data model can identify the establishments and transaction-related insight information for the various malls, separated by each mall area. In step 304, an indication of a location of a device can be determined. For example, it can be determined that a device is at Tyson's Galleria mall. In step 305, if the device is within a designated geographical region, the data for that region can be provided over a network to the device. For example, the transaction-related insight information for the establishments at Tyson's Galleria mall can be provided to the device.

In some aspects of the disclosure, a request for additional transaction-related insight information 1 for one of the establishments can be received. Data representing transactions between customers and the establishment can be retrieved. Additional transaction-related insight information for the establishment based on the retrieved data can be generated. The transaction-related insight information can be provided for display to the user.

Figure 4:
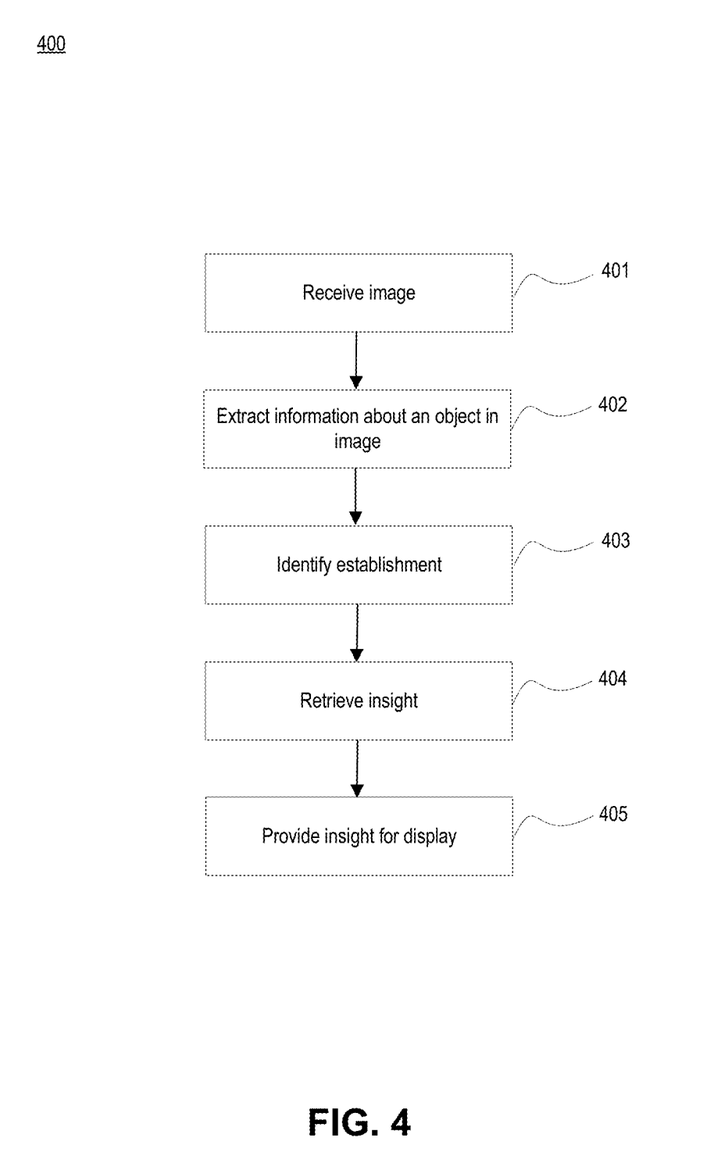
FIG. 4 is a flow diagram 400 showing processing that may occur when providing a transaction-related insight information for display within the system of FIG. 1, according to some embodiments of the present disclosure.

FIG. 4 is a flow diagram 400 showing processing that may occur within the system of FIG. 1, according to some embodiments of the present disclosure. In step 401, digital images from a camera can be received. For example, pictures of teens in front of various stores can be received. In step 402, information about an object in one of the digital images can be extracted. For example, a STARBUCKS™ sign in a picture can be extracted. In step 403, the information about the object can be extracted from a data model to identify an establishment pictured in the digital image. For example, the STARBUCKS™ that is closest to the GSP location of the device can be identified. In step 404, an transaction-related insight information about the establishment can be retrieved to display to a user. For example, transaction-related insight information about this particular STARBUCKS' can be retrieved. In step 405, the transaction-related insight information about the establishment can be provided to display to the user as an augmented reality overlay of a digital image of the establishment. For example, the transaction-related insight information can be displayed to the user as an augmented reality overlay.

In some aspects of the disclosure, an augmented reality application (e.g., an artificial intelligence application) can be used to display transaction-related insight information based on a customer's data (e.g., their banking data, transaction data, etc. for a range of merchants and retailers). Although bars, restaurants, retailers, clothing stores, etc. are discussed below, those of ordinary skill in the art will see that transaction-related insight information into many types of other establishments can also be found and displayed to the user.

In some embodiments, information about an establishment can be displayed as a user is looking at the establishment as they are pointing a device at the establishment. For example, a device may take the form of either a smartphone or a heads up display, such as smart glasses (e.g., GOOGLE glasses, INTEL snapchat smartglasses, etc.). In some aspects of the disclosure, a smart glasses device may be used in conjunction with a mobile phone application, as smartphones may have more processing power and may also have greater network connectivity, as well as possibly having other sensors (e.g., GPS).

Figure 5:
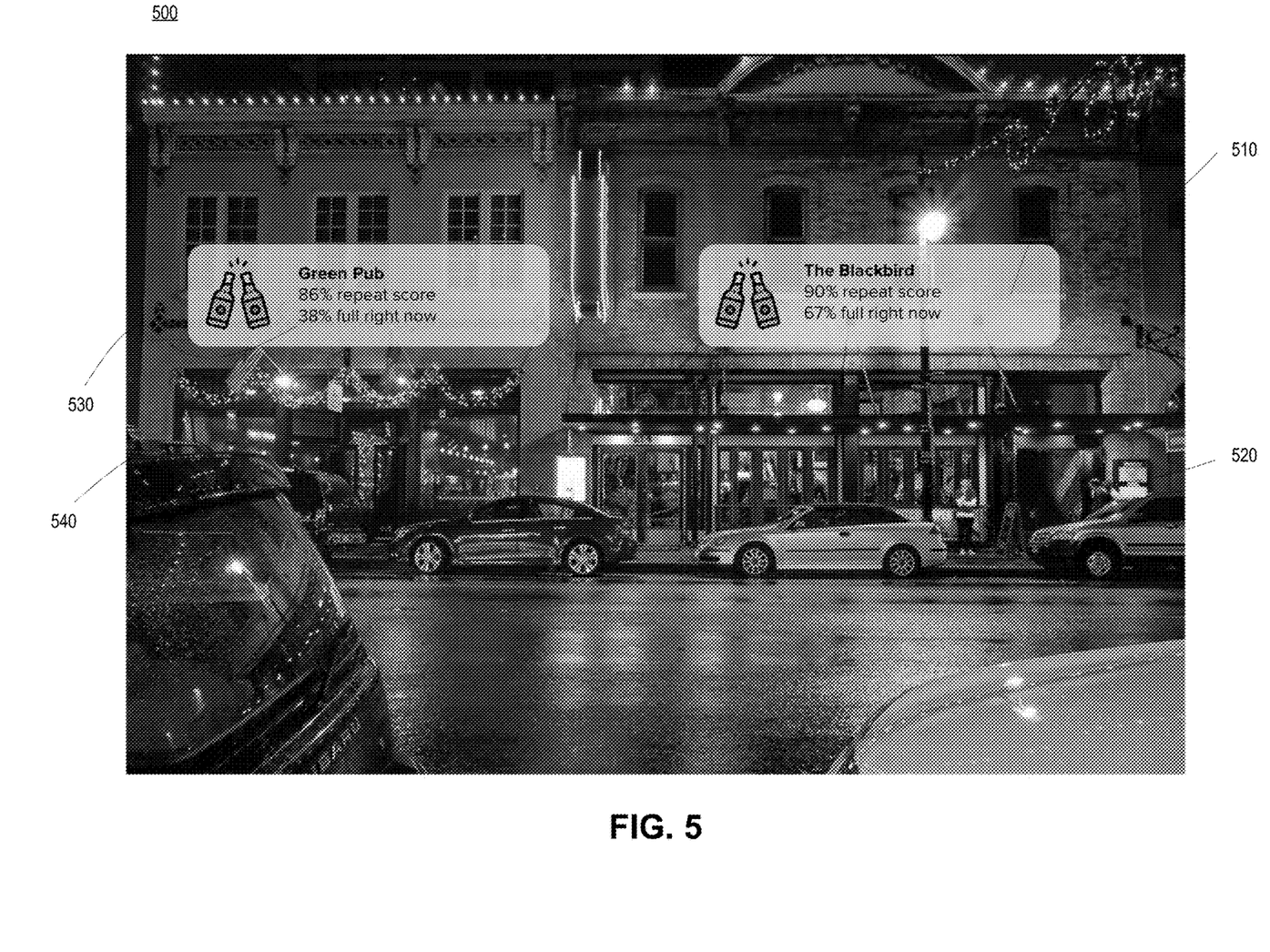
FIG. 5 illustrates an example screen shot that may be used in the system of FIG. 1, according to some embodiments of the present disclosure.

FIG. 5 illustrates an example screen shot that can be used in some embodiments of the disclosure. Two locations 540 (Green Pub) and 520 (The Blackbird) are shown, along with a repeat score (e.g., a frequency or likelihood that a customer transacts at the same merchant again within a given period) and full right now information for both places (530 and 510). In some aspects, the repeat score can be for a certain amount of time (e.g., one month, three months, one year). Repeat scores can also be segmented by type of establishment (e.g., going to a fancy restaurant 3 times a year might mean it's fantastic, whereas a local lunch spot visited a hundred times a year may only mean it is convenient and/or inexpensive). The following information can be used to determine repeat score: type of establishment, duration of repeat window, time of day of purchase, or proximity to the current location (e.g., how out of the way is the place), or any combination thereof. Those of ordinary skill in the art will see that many other types of information can be used in the repeat score. The repeat score can be shown as stars, a thermometer, a percentage number, etc.

Figure 6:
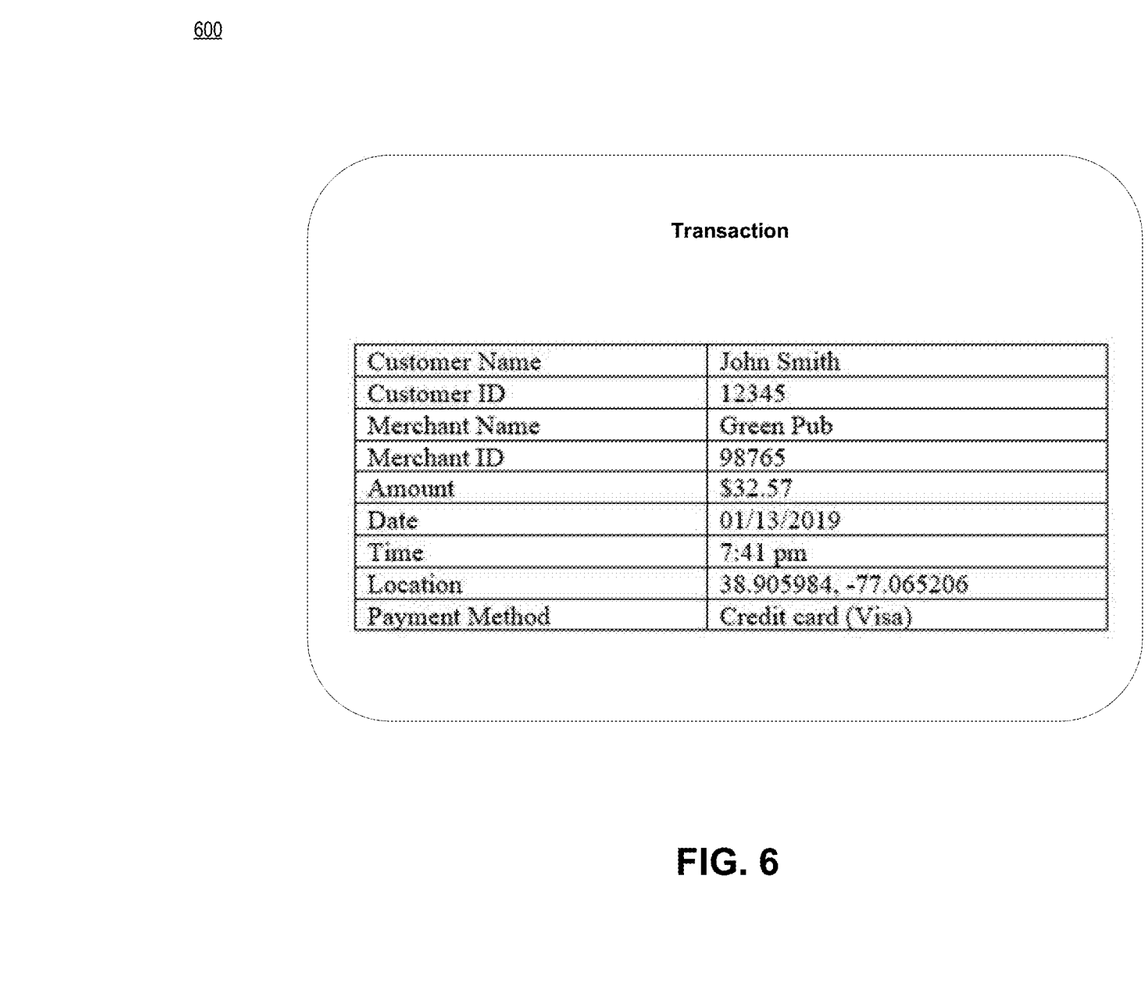
FIG. 6 illustrates example transaction information that may be used in the system of FIG. 1, according to some embodiments of the present disclosure.

FIG. 6 illustrates example transaction data that can be used by the system, according to embodiments of the disclosure.

In some aspects of the disclosure, a score can be determined and provided to users as part of the transaction-related insight information. In some embodiments, the score can include: repeat visit information, information about similar customers that gave high ratings or repeat visits, information about people in your demographic group (e.g., age, sex, etc.) that shop at establishments similar to this establishment, return rate information (e. how often people return goods). By using a large amount of transaction data (e.g., data for 30-40 million customers over time), very powerful transaction-related insight information may be gained and shared with the user.

In some aspects of the disclosure, the transaction data can include hundreds of different properties related to a transaction. This may include: a customer name, a customer ID (e.g., anonymous or not) that allows identification of a person who is making a purchase and what other purchases they have made before and after that transaction, merchant, merchant ID (e.g., anonymous or not), merchant name, location of merchant, amount of the purchase, or how a purchase was made (e.g., in-person, online, with APPLE PAY, with card dip, with card swipe, etc.), or any combination thereof. The confluence of seeing a multitude of transaction data may provide for powerful transaction-related insight information.

According to an aspect of the disclosure, a user may be out on a shopping trip or night out. They can take out their smart glasses and point them at an establishment. The smartphone can use machine learning and geolocation data to build context around where the user is and recognize the establishment. For example, the system can determine that the user is in Tysons Corner Mall (in Virginia) or Georgetown (in Washington D.C.), which are shopping districts where people also eat out. This information can be used to pre-load a series of contextual models to the user's device (e.g., iPAD, iPHONE, etc.). In an aspect of the disclosure, instead of making on-demand calls continuously, a Tysons Corner mall model or a Georgetown model may be loaded onto the device. This may be a lot faster because backend server calls may not need to be made every time the user looks at a new establishment. The mall or area model can include properties that allow the system to identify a number of merchants in that area. The system can continue to use GPS to get a sense of which merchants the user is in front of.

In some aspects of the disclosure, merchant information for a merchant that is fairly close (e.g., within 20 yards, within 50 yards, etc.) can be found. The system can continue to monitor the user's location to enhance their matching. The device can continuously capture digital images, via a camera, and stream those to a processing unit, which can be on or in the device. In some aspects of the disclosure, all of the processing can happen on the smart glasses. The device and/or smart glasses can process each of the captured digital images and try to make a match to a merchant near the user. For example, if the user is in Georgetown and the system determines that there are 300 merchants there, and the user is really close to 16 merchants, the system can stream digital images from the device to a processing unit to try to match which of the 16 merchants the user is viewing. The captured digital images can be run against a model (e.g., a machine learning powered model, an digital image recognition model that looks for certain objects etc.). For example, a model associated with a specific location can be trained with a training set of known digital images from that location. The system can look for objects such as a door, a sign, words on the sign, or objects such as a window or a display unit inside of a window, or any combination thereof. Those of ordinary skill in the art will see that many other types of objects can be used to recognize an establishment. The system can determine if the digital image the user is looking at matches the digital images that the system has coded to that merchant in the system's database.

In some aspects of the disclosure, the system may determine how long a user is looking at an establishment. For example, the system may use an axis of focus (e.g., a processing unit can detect focus). For example, if the user turns her head really quickly she might look at seven different merchants. Instead of making seven different processing requests and displaying seven different merchant transaction-related insight information, the system can detect that the user is moving her head. For example, once the user stops and looks at a particular merchant for more than X number (e.g., a predetermined number and/or a calculated number) of hundreds of milliseconds, the system can understand that the user is focusing on that merchant. At that point, the system can display transaction-related insight information for that merchant, once the system has created a match for the merchant against the model. In some aspects of the disclosure, the transaction-related insight information can be pre-cached (e.g., when the Georgetown model is loaded onto the smart phone or smart glasses) on the device and/or pre-loaded so that they don't all need to be done in real time. In some aspects, the transaction-related insight information can come directly from a backend server, and be dependent on the kind of transaction-related insight information. For example, a repeat score may not need to be done in real-time. For a bar crowd condition, the transaction-related insight information may be refreshed more frequently.

In some aspects of the disclosure, how often transaction-related insight information is provided and/or refreshed can be tied to the duration at which the user is looking at an establishment. For example, if a user quickly gazed at a location, pre-cached information can be loaded, and an API call made in the background to pull more up-to-date information.

In some embodiments, the transaction-related insight information can include the following: name of the merchant (e.g., because sometimes signs are hard to ready), hours of operation, type of merchant, type of establishment (e.g., Mediterranean food), average purchase price, range of purchase price (e.g., dollar signs), transaction data (e.g., average transaction amount is $17.22, or provide a range), repeat score (e.g., for customers with similar purchase history and/or similar demographics), busiest times, general popularity index, how busy at that moment, wait time information, option to call application programming interface (API) for reservation (e.g., OPENTABLE), information on people paying bills at establishment (e.g., getting ready to leave), tip rate information (e.g., average amount is $15, or provide range) (e.g., this can indicate quality or customer satisfaction), or wait list information, or any combination thereof. Those of ordinary skill will see that many other types of transaction-related insight information can also be provided.

In some aspects of the disclosure, transaction-related insight information can be provided related to hot products that are difficult to find. For example, if a user is going to many stores the new iPhone on launch day, the transaction-related insight information can provide product availability (e.g., using SKU data and/or transaction data). For example, the system can call an Apple store API to obtain availability. Or for the restaurant scenario, the system can call an API to pull the menu, etc. Or, for example, in a restaurant situation, the system might have a sense of the amount of time that people spend in that restaurant and can estimate table availability based on the number of bills closed in the last hour (e.g., if people tend to spend X amount of time, the system can sense overall busyness and near-term busyness based on previous behaviors.) Similarly, for product availability, if the system knows the time between the last iPhone launched and the number of transactions in this area, the system can determine that 6,000 transactions were made by Noon. In some aspects of the disclosure, the transaction-related insight information can include transaction information (e.g., either an actual amount or a range for averages and high/low). For example, if there are two stores located close to each other, and one has very high transaction volume and the other one doesn't, instead of just looking at each one independently, the system can determine that if a store that is adjacent to a popular store has less traffic than expected, it may be a terrible store because it should be benefiting from the traffic for the popular store. Whereas if a lesser known store that is on a side street gets moderate traffic, this may indicate a good store because it doesn't benefit from a lot of traffic in the area.

In some aspects of the disclosure, the transaction-related insight information can include information about where locals eat or shop versus where tourists eat or shop to create a tourist index. For example, if a location has a tourist index of 98% this can imply that the user may want to go somewhere else.

In some aspects of the disclosure, the transaction-related insight information can include information on identical and/or similar stores that are nearby. If, for example, the system estimates the user may need to wait in line for 45 minutes at one location, the system can prompt the user to go to another location.

In some aspects of the disclosure, the system can use GPS data and/or transaction data to determine the transaction-related insight information. For example, for full right now information, the system can determine how many customers are inside of this establishment right now (e.g., using transaction information), and the difference between this measure and a median measure (e.g., for the usual rate at this time on a similar weather day). The rate of transactions can also be used. For example, a user may spend different amounts of time at a bar, a restaurant, and a store. GPS data can enhance this information.

In some aspects, maximum headcount can be used. It can be pulled from an external data source, public data (e.g., fire marshal occupancy limit), etc.

Methods described herein may represent processing that occurs within a system for providing an insight about an establishment (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 710 in FIG. 7) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 7:
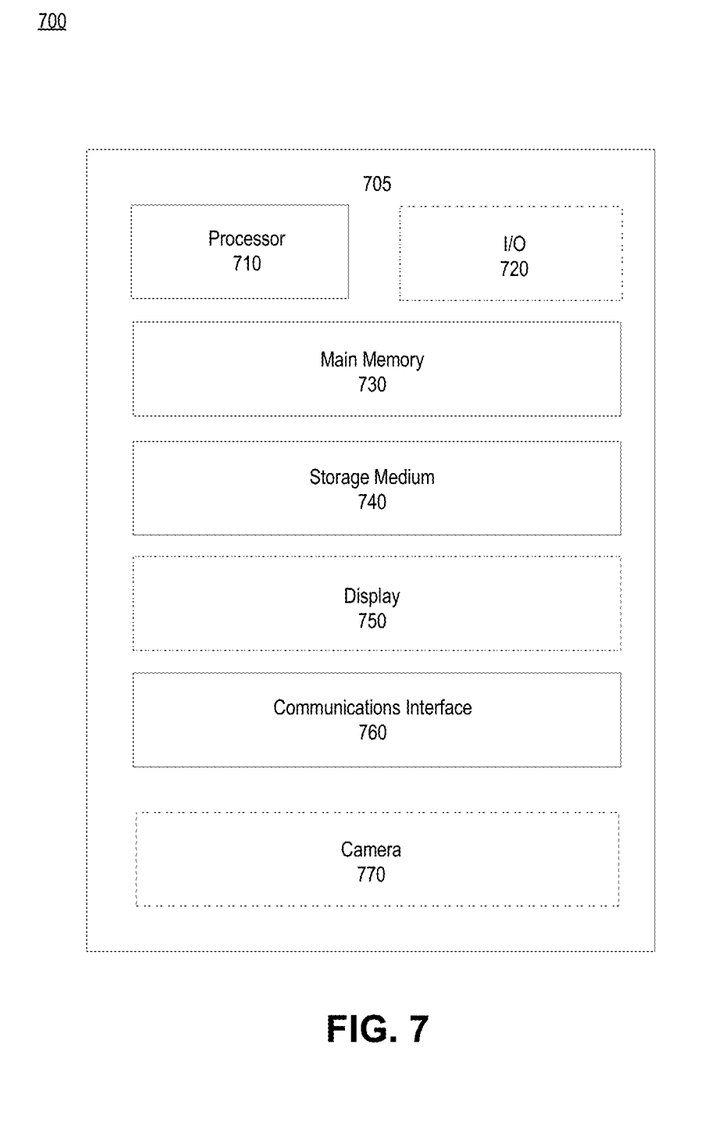
FIG. 7 illustrates an example computer 705, according to some embodiments of the present disclosure.

FIG. 7 illustrates an example computer 705, according to some embodiments of the present disclosure. Computer 705 can include a processor 710 suitable for the execution of a computer program, and can include, by way of example, both general and special purpose microprocessors, and any one or more processor of any kind of digital computer. A processor can receive instructions and data from a main memory 730 (e.g., a read only memory or a random access memory or both). Processor 710 can execute instructions and the memory 730 can store instructions and data. A computer can include, or be operatively coupled to receive data from or transfer data to, or both, a storage medium 740 for storing data (e.g., magnetic, magneto optical disks, or optical disks). Information carriers suitable for embodying computer program instructions and data can include all forms of nonvolatile memory, including by way of example semiconductor memory devices, such as EPROM, EEPROM, flash memory device, or magnetic disks. The processor 710 and the memory 730 can be supplemented by, or incorporated in, special purpose logic circuitry. The computer 705 can also include an input/output 720, a display 750, and a communications interface 760. A camera 770 can also be included.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method, comprising:
retrieving, from a user's device, location information comprising information on multiple establishments within an area;
determining, using the user's device, a user's focus' axis;

detecting, using the user's device, that a user pauses to look at an establishment for more than a predetermined amount of time;
receiving a digital image of the establishment captured by a digital camera connected to the user's device, wherein the digital image represents a physical object of the establishment;
searching the digital image for identification features to identify the establishment using the location information;
retrieving, by the user's device, purchase transaction information associated with the establishment, the purchase transaction information comprising purchase transactions between multiple customers and the establishment;
identifying a capture time of day at which the digital image was captured;
identifying a number of purchase transactions that occurred at the establishment at an identified capture time of day;
determining a median amount of time people spend in the establishment;
calculating crowd information by determining a difference between a number of transactions that occurred at the identified capture time of day with a median rate of customers at the capture time of day on a similar day, the crowd information related to how crowded the establishment is at the capture time of day;
determining a repeat score by comparing the purchase transaction information with at least one of: a type of establishment, a repeat window duration, a time of day of purchase, and proximity to a current establishment, the repeat score related to how many customers have conducted multiple purchase transactions with the establishment;
providing, by a computer system, transaction-related insight information for display to a user on the user's device, the transaction-related insight information comprising the crowd information and the repeat score.

2. The method of claim 1, wherein the identification features comprise: a sign, words on a sign, a logo, a trademark, a door, a window, a facade, or a window display, or any combination thereof.

3. The method of claim 1, further comprising:
identifying a characteristic of the user;
retrieving first establishment transaction data comprising a purchase transaction between the user and a first establishment;
identifying additional customers having the characteristic;
identifying second establishment transactions between the additional customers and a second establishment having a same merchant type as the first establishment;
generating the transaction-related insight information about the second establishment based on the second establishment transactions; and
providing the transaction-related insight information about the second establishment for display to the user.

4. The method of claim 1, further comprising:
identifying return transactions that are associated with returning a product to the establishment;
generating return information representing the return transactions that involve returning the product to the establishment; and
providing the return information as the transaction-related insight information for display to the user.

5. The method of claim 1, wherein the transaction-related insight information is provided for display as a pop-up notification in an augmented reality overlay of the digital image of the establishment on a device, the pop-up notification further including a name of the establishment and an indicator of a type of products or services offered by the establishment.

6. The method of claim 1, further comprising:
calculating an average transaction amount or a range of transaction amounts within which a predetermined percentage of purchase transactions fall; and
providing the average transaction amount or the range of transaction amounts as the transaction-related insight information for display to the user.

7. The method of claim 1, further comprising:
determining a busiest time of day for the establishment; and
providing the busiest time of day as the transaction-related insight information for display to the user.

8. The method of claim 1, further comprising:
determining a percentage of the purchase transactions where a home address of a customer conducting a purchase transaction is within a predetermined distance of the establishment;
calculating a score based on a determined percentage; and
providing the score as the transaction-related insight information to the user.

9. The method of claim 1, wherein the purchase transaction information comprises tip information.

10. The method of claim 1, wherein the transaction-related insight information is pre-cached on the user's device.

11. The method of claim 1, wherein the transaction-related insight information compiles transaction information to determine product availability information, and wherein the product availability information is based on SKU data and/or transaction data.

12. The method of claim 1, wherein consumer traffic information is compared at two or more establishments located by each other.

13. The method of claim 1, wherein the purchase transaction information is also used to determine: repeat visit information, information about similar customers that gave high ratings or repeat visits, information about people in a demographic group that shop at establishments similar to this establishment, return rate information, or any combination thereof.

14. The method of claim 1, wherein busyness information is determined using transaction information indicating how many customers are currently inside the establishment as compared with a usual rate at a similar time on a similar day.

15. A device, comprising:
a memory storing instructions; and
a processor that, when executing the instructions, is configured for:
retrieving, from a user's device, location information comprising information on multiple establishments within an area;
determining, using the user's device, a user's focus' axis;
detecting, using the user's device, that a user pauses to look at an establishment for more than a predetermined amount of time;
receiving a digital image of the establishment captured by a digital camera connected to the user's device, wherein the digital image represents a physical object of the establishment;
searching the digital image for identification features to identify the establishment using the location information;

retrieving, by the user's device, purchase transaction information associated with the establishment, the purchase transaction information comprising purchase transactions between multiple customers and the establishment;

identifying a capture time of day at which the digital image was captured;

identifying a number of purchase transactions that occurred at the establishment at an identified capture time of day;

determining a median amount of time people spend in the establishment;

calculating crowd information by determining a difference between a number of transactions that occurred at the identified capture time of day with a median rate of customers at the capture time of day on a similar day, the crowd information related to how crowded the establishment is at the capture time of day;

determining a repeat score by comparing the purchase transaction information with at least one of: a type of establishment, a repeat window duration, a time of day of purchase, and proximity to a current establishment, the repeat score related to how many customers have conducted multiple purchase transactions with the establishment;

providing transaction-related insight information for display to a user on the user's device, the transaction-related insight information comprising the crowd information and the repeat score.

16. The device of claim 15, wherein the user's device is mobile phone or a wearable computer.

17. The device of claim 15, wherein the processor is further configured to:

extract the information about the physical object in the digital image after making a determination that the physical object in the digital image was within a predetermined distance of a camera when the digital image was captured; and discard a second digital image after determining that the physical object in the second digital image was greater than the predetermined distance from the camera when the second digital image was captured.

18. The device of claim 15, wherein the processor is further configured to receive the digital image over a network from a remote device.

19. The device of claim 15, wherein the processor is further configured to:

determine a location of the user's device; and download a cached model based on the location of the user's device.

20. The device of claim 15, wherein the processor is further configured to:

determine a location of the user's device with a global positioning system (GPS) receiver;

identify, based on a cached model, a number of establishments within a predetermined distance of the user's device based on the location; and compare information about the physical object to previously stored establishment information to identify the establishment pictured in the digital image.

* * * * *